United States Patent Office 2,908,693
Patented Oct. 13, 1959

2,908,693

PROCESS FOR THE PRODUCTION OF 2-METHYL-DIHYDROTESTOSTERONES

Howard J. Ringold and George Rosenkranz, Mexico City, Mexico, assignors to Syntex S.A., Mexico City, Mexico, a corporation of Mexico No Drawing. Application December 16, 1957
Serial No. 702,760

Claims priority, application Mexico December 17, 1956

4 Claims. (Cl. 260—397.4)

The present invention relates to a novel process for the production of cyclopentanophenanthrene derivatives.

More particularly the present invention relates to a process for the production of 2-methyl dihydrotestosterone derivatives and esters thereof as well as 2-methyl dihydrotestosterone derivatives having a C–17 lower alkyl group. The products of the process of the present invention have a useful high anabolic-androgenic ratio and are especially valuable for treatment of those ailments where an anabolic or antiestrogenic effect together with a lesser androgenic effect is desired.

In our U.S. application Serial No. 636,860, filed January 29, 1957, there is disclosed a process for the production of 2-methyl androstane compounds having a C–17 lower alkyl group involving preparing the corresponding 2-hydroxymethylene derivatives, transformation of these derivatives into 2-methyl-2'-formyl compounds and removal of carbon monoxide to prepare the 2-methyl product.

In accordance with the present invention it has been discovered that 2-methyl androstane compounds or dihydrotestosterone derivatives may be prepared by a simple one step process involving catalytic hydrogenation of the corresponding 2-hydroxymethylene starting material. In its more specific aspects the process therefore involves treating dihydrotestosterone or a 17-lower alkyl dihydrotestosterone as with ethyl formate and sodium hydride to form the corresponding 2-hydroxymethylene derivative and catalytically hydrogenating the 2-hydroxymethylene derivative. Further it has been discovered that catalytic hydrogenation of a 2-acyloxymethylene derivative also produces the desired 2-methyl compounds.

The process of the present invention may therefore be illustrated by the following equation:

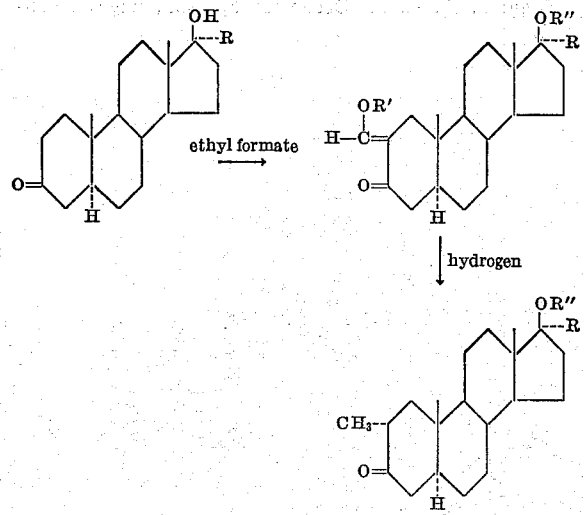

In the above equation R represents hydrogen or R represents a lower alkyl group of less than 7 carbon atoms such as methyl, ethyl or propyl. R' represents an acyl group of a hydrocarbon carboxylic acid of 2 to 12 carbon atoms as conventional in esterified steroid alcohols such as acetoxy, propionoxy, benzoyloxy etc. or R' represents hydrogen. R" represents hydrogen when R is a lower alkyl group and is either hydrogen or an acyl group similar to R' when R is hydrogen.

In practicing the process as outlined above, dihydrotestosterone, or a 17-lower alkyl dihydrotestosterone, such as 17-methyl dihydrotestosterone or 17-ethyl dihydrotestosterone (which may be prepared by treatment of the known testosterone, 17-methyl testosterone or 17-ethyl testosterone with an alkali metal in liquid ammonia for example) are suspended in an inert organic solvent such as benzene and then mixed with ethyl formate and sodium hydride. The mixture is then stirred for a period of time of the order of 5 hours at room temperature and under nitrogen atmosphere. The suspension is then filtered and the mixture of the sodium salt of the desired hydroxymethylene compound is then treated with acid such as hydrochloric acid to precipitate the hydroxymethylene compound.

The hydroxymethylene compound thus prepared may then be conventionally esterified to form a diester of a conventional type as previously set forth when the 17-hydroxy group of the starting compound is secondary or a monester if the 17-hydroxy group is tertiary (as in 17-lower alkyl derivatives). The hydroxymethylene compound or the ester thereof in organic solvent solution is then hydrogenated in the presence of a hydrogenation catalyst preferably at room temperature and atmospheric pressure until absorption of hydrogen ceased.

Suitable organic solvents for the hydrogenation step are for example lower aliphatic alcohols such as methanol, ethyl acetate, dioxane or acetic acid. Preferable hydrogenation catalysts are palladium or platinum catalysts such as palladium on charcoal or palladium on barium sulfate or platinum oxide. This hydrogenation step produces the corresponding 2-methyl compound from either the ester of or the free hydroxymethylene compound and leaves any 17-ester group intact. The resultant crude 2-methyl products were then purified by chromatography. Where the free hydroxymethylene derivatives were being treated or when a free 2α-methyl product was desired it was found desirable to treat the crude hydrogenation product with alkali prior to chromatography.

The following specific examples serve to illustrate but are not intended to limit the present invention.

*Example I*

A suspension of 10 g. of dihydrotestosterone in 500 cc. of anhydrous benzene free of thiophene was mixed with 10 cc. of ethyl formate and 3 g. of sodium hydride and the mixture was stirred for 5 hours under an atmosphere of nitrogen and at a temperature of approximately 25° C. The resulting suspension was filtered, the resulting mixture of the sodium salt of the hydroxymethylene compound and the excess of sodium hydride was washed with benzene and dried. This mixture was slowly added to a vigorously stirred solution of 20 cc. of concentrated hydrochloric acid in 500 cc. of water, and the stirring was continued for 30 minutes at the end of which the precipitate was collected and well washed with distilled water. After drying in vacuo, there was obtained 9.7 g. of 2-hydroxymethylene-dihydrotestosterone.

7 g. of 2-hydroxymethylene-dihydrotestosterone was dissolved in 300 cc. of methanol and mixed with 2.5% of a 10% palladium on charcoal catalyst. The mixture was hydrogenated at approximately 25° C. at atmospheric pressure until the absorption of hydrogen ceased. The catalyst was removed by filtration, 1 g. of potassium hydroxide in 5 cc. of water was added to the solution which was then kept for 1 hour at room temperature. 2 cc. of acetic acid was added, the solvent was completely removed under reduced pressure, water was added to the residue and the product was extracted with methylene dichloride. The extract was washed with water, dried over anhydrous sodium sulfate and evaporated to dryness under vacuum. The residue was dissolved in benzene and transferred to a chromatographic column with 125 g. of alkaline alumina. The column was washed with successive fractions of 100 cc. of benzene, whereupon the desired product was eluted from fractions 2 to 6. After evaporating the solvent, the product was crystallized from a mixture acetone-hexane to yield 3.3 g. of pure 2α-methyl-dihydrotestosterone.

*Example II*

2 g. of 2-hydroxymethylene-dihydrotestosterone, obtained in accordance with Example I, dissolved in 80 cc. of acetic acid was hydrogenated with 1.0 g. of 10% palladium on charcoal catalyst under the conditions described in the previous example. After removing the catalyst by filtration, the solvent was evaporated to dryness under reduced pressure and the residue was mixed with 100 cc. of methanol and 1 g. of potassium hydroxide. The solution was refluxed for 30 minutes and then diluted with water and extracted with methylene dichloride. The extract was washed with water to neutral, dried over anhydrous sodium sulfate and evaporated to dryness under vacuum. The residue was dissolved in benzene and chromatographed under the conditions described in Example I. There was thus obtained 2α-methyl-dihydrotestosterone.

*Example III*

A mixture of 1 g. of 2-hydroxymethylene-dihydrotestosterone, obtained in accordance with the method described in Example I, 10 cc. of pyridine and 2 cc. of acetic anhydride was allowed to react at room temperature for 16 hours and then poured into water. The product was extracted with methylene dichloride and washed consecutively with dilute hydrochloric acid, sodium bicarbonate solution and water, dried and evaporated to dryness under reduced pressure. There was thus obtained the diacetate of 2-hydroxymethylene-dihydrotestosterone.

This diacetate was hydrogenated and then worked up by the methods described in the previous examples, thus producing 2α-methyl-dihydrotestosterone, identical to the one obtained in accordance with such examples.

*Example IV*

Following the method described in the previous examples, 17α-methyl-dihydrotestosterone was converted into 2α,17α-dimethyl-dihydrotestosterone.

*Example V*

Following the method described in Examples I, II, and III, 17α-ethyl-dihydrotestosterone was converted into 2α-methyl-17α-ethyl-dihydrotestosterone.

*Example VI*

A mixture of 1 g. of 2-hydroxymethylene-dihydrotestosterone, obtained in accordance with Example I, 10 cc. of pyridine and 2 cc. of propionic anhydride was allowed to react at room temperature for 16 hours and then poured into water. The resulting suspension was heated for 1 hour on the steam bath to hydrolyze the excess of propionic anhydride, cooled and extracted with methylene dichloride. The extract was consecutively washed with dilute hydrochloric acid, sodium bicarbonate solution and water, dried over anhydrous sodium sulfate and evaporated to dryness under vacuum. There was thus obtained the dipropionate of 2-hydroxymethylene-dihydrotestosterone which was treated with hydrogen, in methanol solution, under the conditions described in Example I. When the uptake of hydrogen ceased, the catalyst was filtered and the solution was evaporated to dryness under vacuum. The residue was dissolved in a mixture benzene-hexane, transferred to a chromatographic column with neutral alumina and the product was eluted with mixtures benzene-hexane, gradually increasing the proportion of benzene in the mixture. Crystallization of the eluates from acetone-hexane yielded the propionate of 2α-methyl-dihydrotestosterone.

We claim:

1. A process for the production of compounds selected from the class consisting of 2α-methyl dihydrotestosterone, 17-esters thereof of hydrocarbon carboxylic acids of 2 to 12 carbon atoms and 2α-methyl 17α-lower alkyl dihydrotestosterone comprising hydrogenating the corresponding 2-hydroxymethylene derivatives in the presence of a hydrogenation catalyst selected from the group consisting of palladium and platinum catalyst.

2. The process of claim 1 wherein the starting material is a diester of 2-hydroxymethylene dihydrotestosterone and the product is a 17-ester of 2α-methyl dihydrotestosterone.

3. The process of claim 1 wherein the starting material is 2-hydroxymethylene dihydrotestosterone and the product is 2α-methyl dihydrotestosterone.

4. The process of claim 1 wherein the starting material is a 17α-lower alkyl 2-hydroxymethylene dihydrotestosterone and the product is a 17α-lower alkyl 2α-methyl dihydrotestosterone.

References Cited in the file of this patent

Hogg: J. A. C. S., December 5, 1955, pages 6401–6402.